(12) United States Patent
Wang et al.

(10) Patent No.: US 7,006,729 B2
(45) Date of Patent: Feb. 28, 2006

(54) OPTICAL COMPONENTS HAVING REDUCED INSERTION LOSS

(75) Inventors: Yan Wang, Norcross, GA (US); Yuan P. Li, Duluth, GA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 509 days.

(21) Appl. No.: 10/039,245

(22) Filed: Dec. 31, 2001

(65) Prior Publication Data

US 2003/0123796 A1    Jul. 3, 2003

(51) Int. Cl.
  *G02B 6/34*    (2006.01)
  *G02B 6/26*    (2006.01)

(52) U.S. Cl. .......................... 385/37; 385/46
(58) Field of Classification Search .......... 385/37, 385/39, 46, 48, 129–130
  See application file for complete search history.

(56) References Cited

U.S. PATENT DOCUMENTS

| 4,902,086 A | 2/1990 | Henry et al. ............. 350/96.12 |
| 5,002,350 A | 3/1991 | Dragone .................. 350/96.15 |
| 5,136,671 A | 8/1992 | Dragone ....................... 385/46 |
| 5,745,618 A | 4/1998 | Li .............................. 385/46 |
| 2002/0131704 A1 * | 9/2002 | Doerr .......................... 385/37 |
| 2002/0159696 A1 * | 10/2002 | Yamauchi et al. ............ 385/37 |
| 2002/0172460 A1 * | 11/2002 | Tyan et al. ................... 385/37 |
| 2003/0012497 A1 * | 1/2003 | McGreer et al. .............. 385/37 |

OTHER PUBLICATIONS

C.H. Henry et al., "Glass Waveguides on Silicon for Hybrid Optical Packaging," *Journal of Lightwave Technology*, vol. 7, No. 10, Oct. 1989, pp. 1530-1539.

C. van Dam et al., "Loss Reduction for Phased-Array Demultiplexers Using a Double Etch Technique," *Integrated Photonics Research*, vol. 6, 1996, pp. 52-55.

* cited by examiner

*Primary Examiner*—Brian Healy
*Assistant Examiner*—Sarah Song
(74) *Attorney, Agent, or Firm*—Mayer Fortkort & Williams, PC; Stuart H. Mayer, Esq.

(57) ABSTRACT

An optical device is provided which includes a slab waveguide and at least one input waveguide coupled to a first side of the slab waveguide. The device also includes a plurality of output waveguides coupled to a second side of the slab waveguide. The slab waveguide has a segmented transition region that includes a plurality of waveguiding regions spaced apart from one other by at least one discrete sector.

26 Claims, 7 Drawing Sheets

OPTICAL COMPONENTS HAVING REDUCED INSERTION LOSS

TECHNICAL FIELD

The present invention relates generally to optical components employed in optical transmission systems, and more specifically to a technique for reducing the insertion loss of an optical component having an array of input and output waveguides.

BACKGROUND OF THE INVENTION

WDM optical transmission systems employ a variety of different passive components. Such components are increasingly being fabricated on Planar Light-Guide Circuits (PLC). A planar lightguide circuit, also known as an optical integrated circuit, can be readily mass produced because the processing steps are compatible with those used in silicon integrated circuit (IC) technology, which are well known and geared for mass production.

One common type of planar lightguide circuit employs doped-silica waveguides fabricated with silicon optical bench technology. Doped-silica waveguides are usually preferred because they have a number of attractive properties including low cost, low loss, low birefringence, stability, and compatibility for coupling to fiber. Such a planar lightguide circuit is fabricated on a carrier substrate, which typically comprises silicon or silica. The substrate serves as a mechanical support for the otherwise fragile lightguide circuit and it can, if desired, also play the role of the bottom portion of the cladding. In addition, it can serve as a fixture to which input and output fibers are attached so as to optically couple cores of an input/output fiber to the cores of the planar lightguide circuit. The fabrication process begins by depositing a base or lower cladding layer of low index silica on the carrier substrate (assuming the substrate itself is not used as the cladding layer). A layer of doped silica with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. This technology is well known and is generally described, for example, in U.S. Pat. No. 4,902,086 issued to C. H. Henry et al., and in an article entitled "Glass Waveguides on Silicon for Hybrid Optical Packaging" at pp. 1530–1539 of the Journal of Lightwave Technology, Vol. 7, No. 10, October 1989.

One important passive component that can be fabricated on a PLC is an optical "star coupler" in which waveguides are radially positioned on opposite sides of a slab waveguide. As used in the present invention, a slab waveguide means a planar area, which is large compared to the area of an individual waveguide of the same length, that supports lightwave transmission between input and output waveguides. Optical power entering the slab from input waveguides on one side of the slab is conveyed to output waveguides on the other side. (Ideally, the power is distributed equally among all of the output waveguides.) In an M×N star coupler, for example, the optical power carried by each input waveguide is transmitted across the slab and distributed among the N output waveguides, which are generally arranged in an array. However, if the waveguides in the output array are not well coupled (which is generally the case for star couplers in a so-called "Dragone" router because of the gaps between the array waveguides), then there is a loss of power due to the scattering of light at the junction between the array and the slab. Such losses comprise a major portion of the router's insertion loss.

One technique for reducing the insertion loss of an optical device, such as the aforementioned Dragone router, is taught in a paper entitled "Loss Reduction for Phased-Array Demultiplexers Using a Double Etch Technique," which was published in Integrated Photonics Research, Technical Digest Series, Vol. 6, Apr. 29–May 2, 1996. In this technique, a transition region having a shallow etch depth is inserted at the junction between the slab and the array waveguides. As might be expected, coupling between adjacent waveguides is improved and coupling losses are decreased. Nevertheless, a greater reduction in insertion loss is desired, and the double etch technique adds a processing step.

Another technique for reducing insertion loss in an optical device is disclosed in U.S. Pat. No. 5,745,618. In this reference insertion loss is reduced between the slab waveguide and the output waveguide array of a star coupler by providing the output waveguide array with a transition region. The transition region includes a number of silica paths that intersect the output waveguide array. One problem with this approach is that it is difficult to manufacture the resulting device because the many small areas adjacent to the intersections between the output waveguides and the silica paths must be completely filled with cladding material, which is difficult to accomplish because of their small dimensions.

Accordingly, it would be desirable to provide an improved technique for reducing insertion loss in an optical device that does not involve additional processing steps and which can be implemented in a highly reliable manner.

SUMMARY OF THE INVENTION

In accordance with the present invention, an optical device is provided which includes a slab waveguide and at least one input waveguide coupled to a first side of the slab waveguide. The device also includes a plurality of output waveguides coupled to a second side of the slab waveguide. The slab waveguide has a segmented transition region that includes a plurality of waveguiding regions spaced apart from one other by at least one discrete sector.

In accordance with another aspect of the invention, the plurality of waveguiding regions have widths that progressively decrease as they approach the second side of the slab waveguide.

In accordance with yet another aspect of the invention, the plurality of waveguiding regions and the plurality of output waveguides each comprise a light-carrying core material whose indices of refraction are substantially equal to one another. Additionally, the discrete sectors located between each pair of waveguiding regions may have a lower index of refraction than the waveguiding regions.

In accordance with another aspect of the invention, the discrete sectors have widths that progressively increase as they approach the second side of the slab waveguide. Moreover, the waveguiding regions may be substantially parallel to each other.

In accordance with another aspect of the invention, a planar light-guide circuit is provided. The circuit includes a substrate, a slab waveguide located on the substrate, and at least a first waveguide also located on the substrate and which is coupled to a first side of the slab waveguide. In addition, at least a plurality of second waveguides are located on the substrate and coupled to a second side of the slab waveguide. The circuit also includes N waveguiding regions, where N is an integer greater than or equal to 2. The waveguiding regions are located within the slab waveguide and are spaced apart from one another by segments of predetermined width.

DETAILED DESCRIPTION

Figure 1:
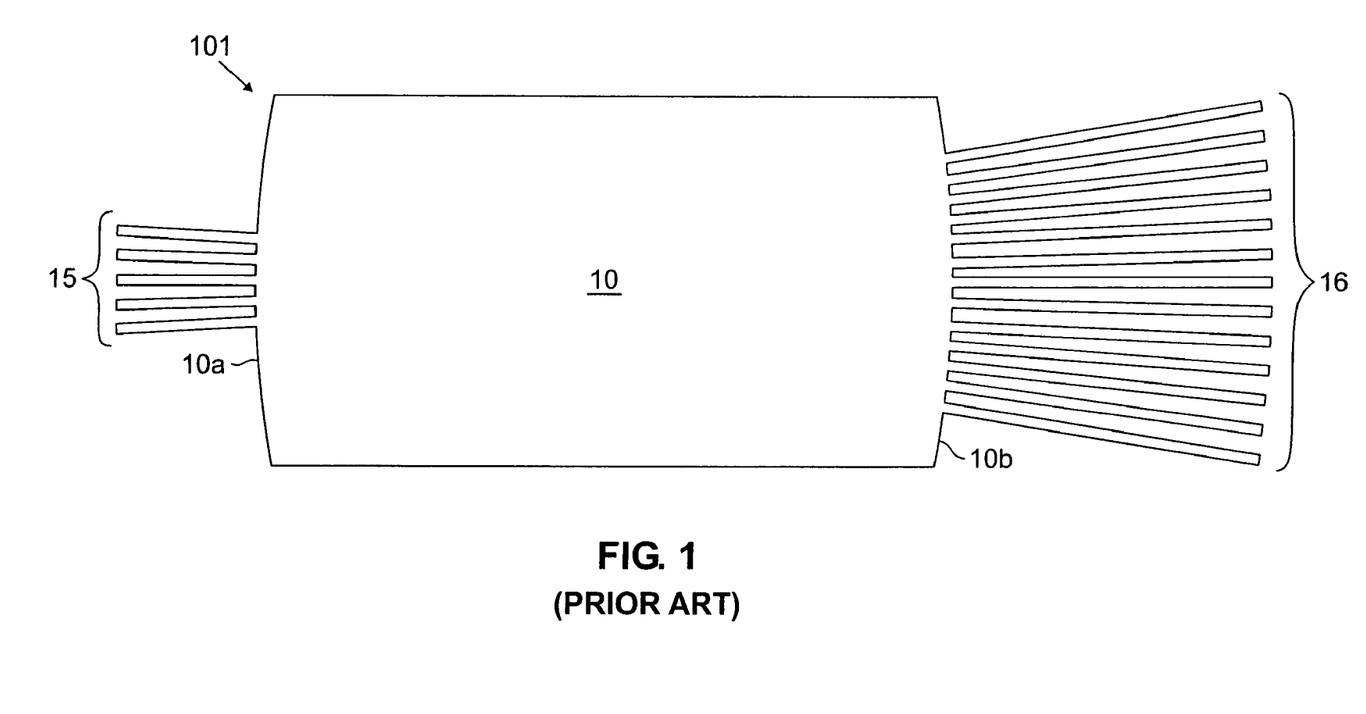
FIG. 1 shows a known star coupler having a number of input and output ports.

FIG. 1 shows a known star coupler, which splits the optical power entering any of its input ports among all of its output ports. Star coupler 101 includes a free-space region 10 formed by an optical slab waveguide 10 having two curved, preferably circular, boundaries 10a and 10b. Power transfer between an input waveguide array 15 and an output waveguide array 16 is accomplished through radiation in the slab 10. The waveguide arrays 15 and 16 are radially directed toward virtual focal points and configured so that their respective foci are located a predetermined distance away from and outside the slab waveguide 10 to minimize phase errors caused by mutual coupling between adjacent waveguides. Each of these waveguide arrays is coupled to the slab waveguide 10 in a substantially uniform fashion along boundaries 10a and 10b. Such star couplers are typically constructed using silicon optical bench (SiOB) technology on a single glass substrate. Star couplers are well understood by those skilled in the art of planar optical devices and are described in a number of patents including, for example, U.S. Pat. No. 4,904,042. As discussed above, there is a loss of power due to the scattering of light at the junction between the input and output arrays and the slab waveguide. Such loss is referred to as insertion loss and, in the case of star coupler 101, it amounts to about 0.8 dB at an operating wavelength of 1.55 microns, which is unacceptably large for many applications.

Figure 2:
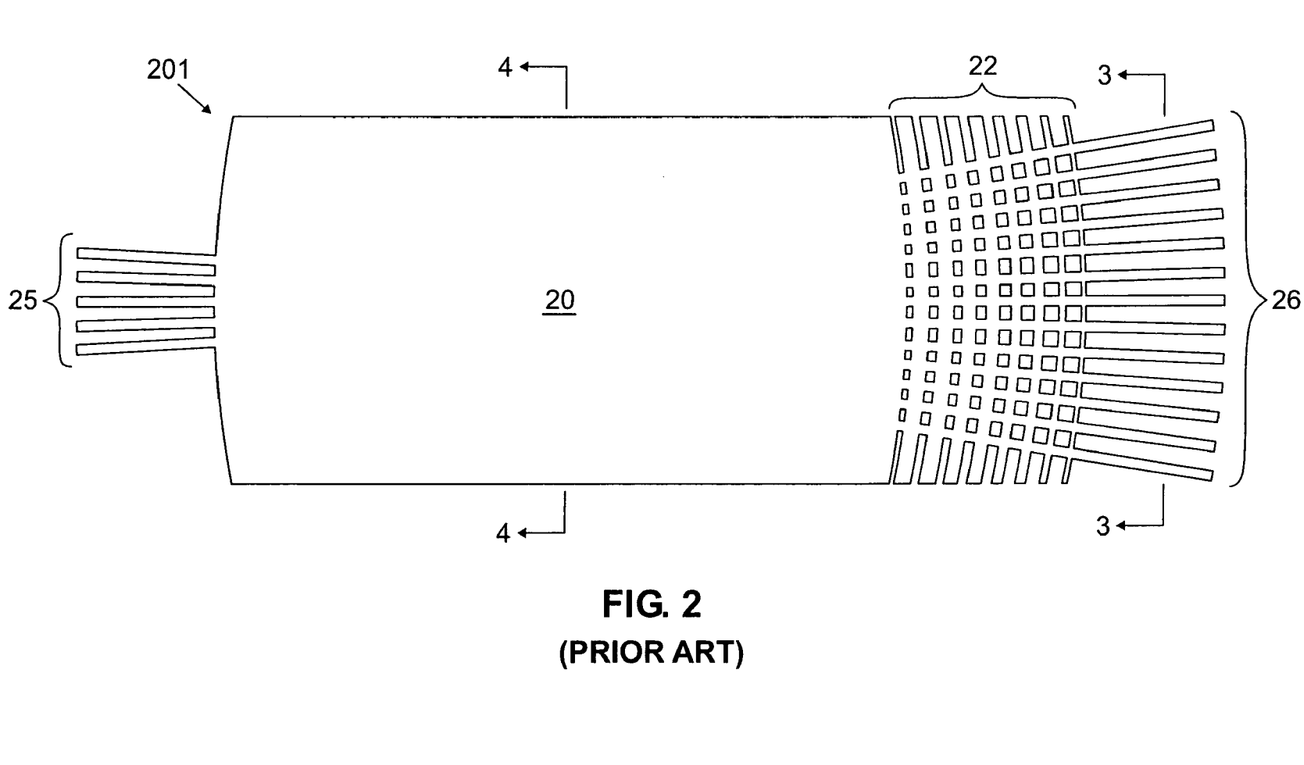
FIG. 2 shows another known star coupler having a transition region for reducing insertion loss.

FIG. 2 discloses another known star coupler 201 of the type disclosed in U.S. Pat. No. 5,745,618. As shown, output waveguide array 26 of star coupler 201 has a transition region 22 comprising a plurality of paths of silicon material, which are generally parallel to each other and which transversely intersect the output waveguides 26 and which significantly reduce insertion loss. The use of such a transition region 22 reduces the insertion loss from about 0.8 dB to about 0.3 dB. Relative to the known star coupler shown in FIG. 1, when the total optical input power is 1 milliwatt (mW), the total output power is 0.832 mW; but in the star coupler shown in FIG. 2, when the total input power is 1 mW, the total output power is 0.933 mW. This improvement translates into the ability to either serve more customers with the same equipment, or to reduce the amount of equipment needed to serve the same number of customers.

Figure 3:
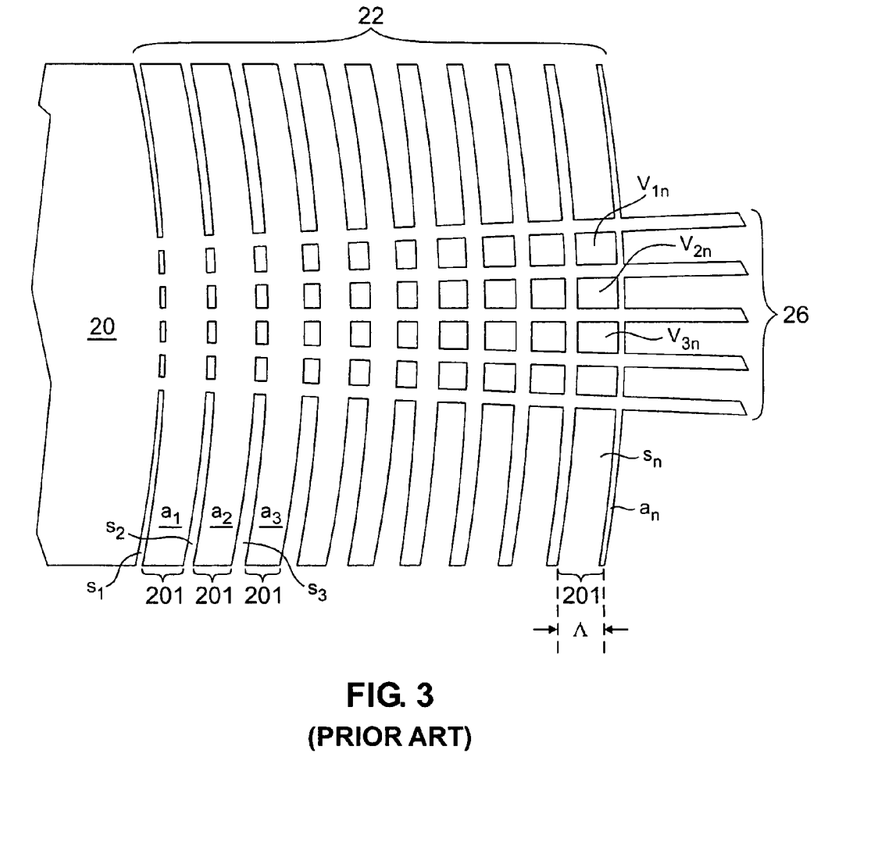
FIG. 3 is an enlarged view of the output transition region of the star coupler shown in FIG. 2.

FIG. 3 shows an enlarged view of the transition region 22 of star coupler 201. FIG. 3 illustrates that the silica paths $a_1 \ldots a_n$, which comprise the transition region, have progressively smaller widths as they become further away from the slab 20. Moreover, separation gaps $s_1 \ldots s_n$, between adjacent silica paths become progressively larger as they become further away from the slab 20. As further disclosed in the aforementioned patent, if the combined width 201 of each path $a_n$ and its adjacent separation gap $s_n$ is a constant, then the width W of the first separation gap $s_1$ will be about 2 microns whereas the width of separation gap $s_n$ will be about 18 microns.

One problem with the known star coupler 201 shown in FIGS. 2 and 3 is that the transition region 22 requires stringent process control to ensure its successful fabrication. In particular, spaced regions $r_{mn}$ (see FIG. 3), which are defined by the gaps between silica paths $a_1 \ldots a_n$ and the individual waveguides 26, must be completely filled with cladding material. Because of their small size, this requirement can be difficult to fulfill without the formation of voids in the spaced regions $r_{mn}$. Accordingly, when this device is fabricated in mass production, the resulting yield may be relatively low, increasing their unit cost.

The present inventors have recognized that the same advantages which accrue from the star coupler 201 shown in FIG. 2 can also be achieved by placing the transition region within the slab waveguide 20 rather than within the waveguide array 26. Moreover, this alternative configuration can be fabricated with less stringent process control, increasing the yield and thus lowering the unit cost of the device.

Figure 4:
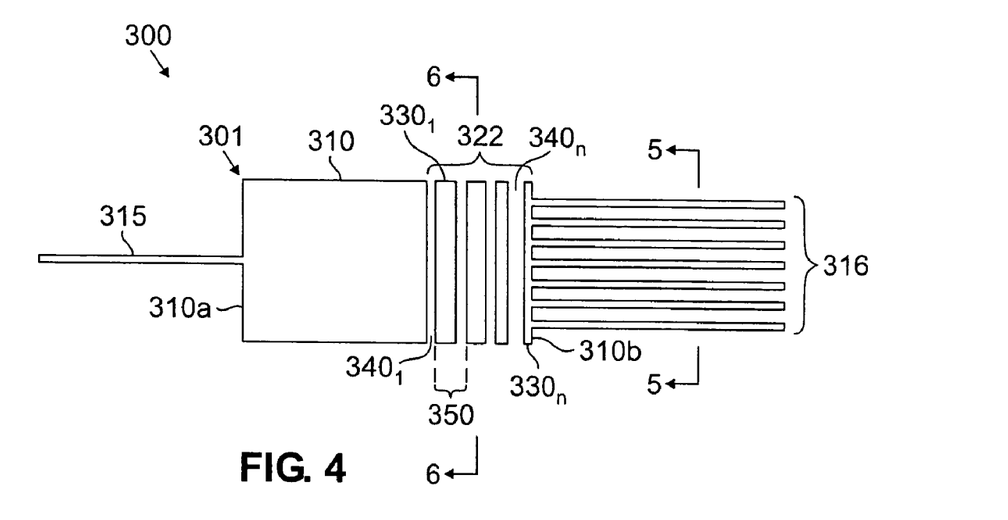
FIG. 4 shows one embodiment of a star coupler constructed in accordance with the present invention.

FIG. 4 shows one embodiment of a star coupler 300 constructed in accordance with the present invention. Star coupler 300 includes a free-space region 301, which comprises an optical slab waveguide 310 having two curved, preferably circular, boundaries 310a and 310b. Power is transferred between one or more input waveguides 315 and an array of two or more output waveguides 316 by radiation through the slab waveguide 310. Similar to the star couplers depicted in FIGS. 1 and 2, the input and output waveguides 315 and 316 are radially directed toward virtual focal points and configured so that their respective foci are located a predetermined distance away from and outside the slab 310 to minimize phase errors caused by mutual coupling between adjacent waveguides. Optical slab waveguide 310 of star coupler 301 has a transition region 322 over which waveguide 310 is segmented. That is, transition region 322 is defined by a plurality of waveguiding segments 3301 . . . 330n, which are generally parallel to each other and which extend in a direction that is generally orthogonal to input and output waveguide 315 and 316 (assuming, for simplicity of illustration only, that waveguides 315 and 316 are linear in the plane of the substrate). Waveguiding segments 3301 . . . 330n are formed from core material whose index of refraction is substantially the same as the remainder of slab waveguide 310, as well as input and output waveguides 315 and 316. Indeed, slab waveguide 310, input and output waveguides 315 and 316, and waveguiding segments 3301 . . . 330n are preferably fabricated in the same step, and so they all have the same thickness. As seen in FIG. 4, waveguiding segments 3301 . . . 330n are separated by regions 3401 . . . 340n, which are filled with cladding material rather than core material. Because the regions

3401 . . . 340*n* do not intersect the waveguide 316, they extend over a much greater area than the spaced regions rmn seen in FIG. 3, and thus voids in the cladding are less likely to occur. Similar to the star coupler shown in FIG. 2, the inventive star coupler can substantially reduce the insertion loss.

Figure 5:
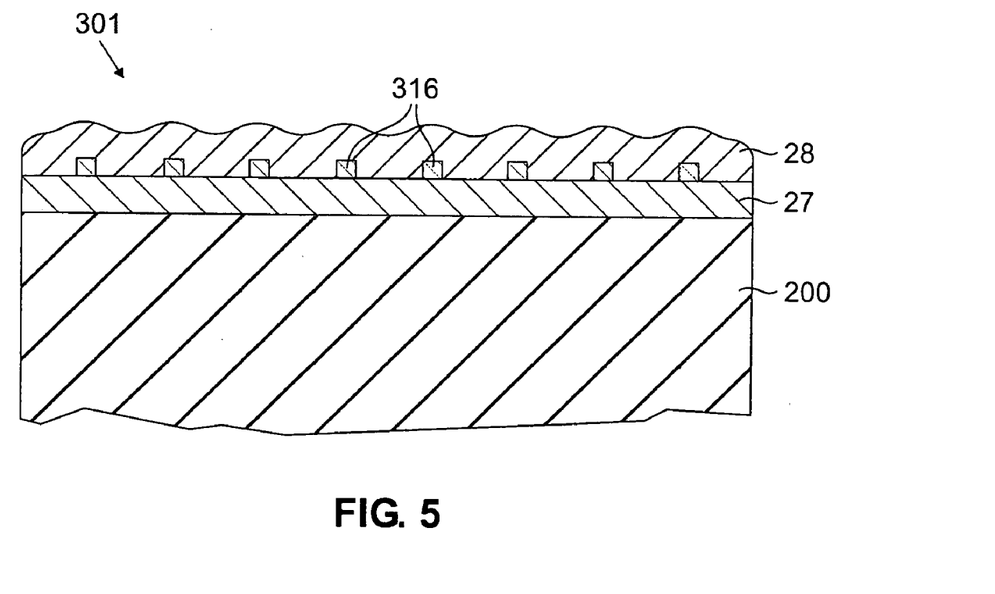
FIGS. 5 and 6 show cross sections of the star coupler shown in FIG. 4 respectively taken along lines 5—5 and 6—6 in FIG. 4.
Figure 6:
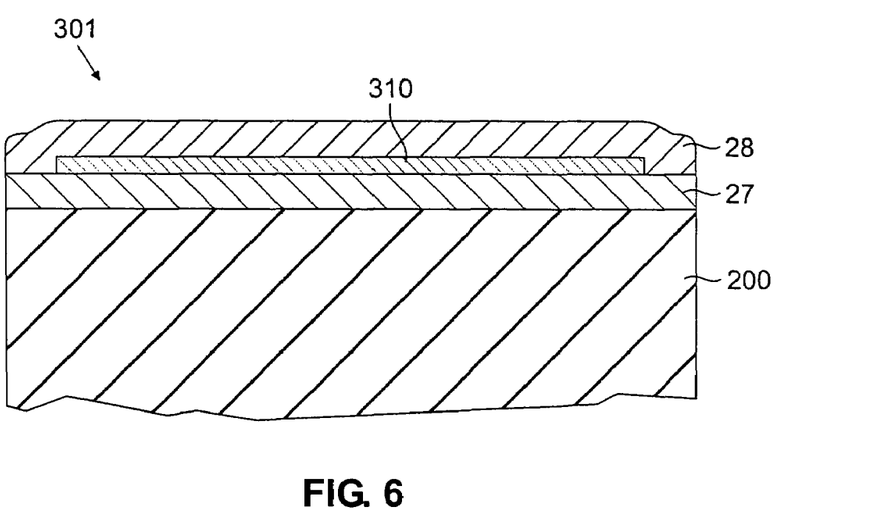

FIGS. 5 and 6 show cross sections of star coupler 301 respectively taken along lines 5—5 and 6—6 in FIG. 4. It should be noted that in FIGS. 4–6, like elements are denoted by like reference numerals. Moreover, the materials and dimensions that follow are presented for illustrative purposes only and should not be construed as a limitation on the invention. Referring to FIGS. 5 and 6, substrate 200 comprises silicon having a thickness of 500 microns. Cladding 27 comprises a 15 micron layer of silica having an index of refraction of about 1.445 at a wavelength of 1.55 microns. Waveguide cores 316, which are generally square in shape and have a thickness and width of about 7 microns, comprise silica having an index of refraction of about 1.454 at a wavelength of 1.55 microns. In general, however, the dimensions of the waveguide cores 316 are chosen to be as large as possible for strong optical confinement and low propagation loss, but small enough so that the waveguides remain single-mode. The waveguide cores 316 are separated from one another by a distance of about 2.5 microns where they are closest together near the slab waveguide 310. Cladding layer 28, which is substantially the same as cladding layer 27 in refractive index, is deposited on top of cores 316 to complete the structure. In a star coupler, the length of slab waveguide 310 typically ranges from about 0.5 cm to about 2.0 cm, depending on the number of input and output waveguides.

Returning to FIG. 4, waveguiding segments 3301 . . . 330*n* have progressively smaller widths as they approach output waveguides 316. For instance, in the embodiment of the invention shown in FIG. 4, waveguiding segment 3301 may have a width of about 18 microns whereas waveguiding segment 330*n* may have a width of about 2 microns. Moreover, the width of cladding regions 3401 . . . 340*n* between adjacent waveguiding segments become progressively larger as they approach waveguides 316. For instance, if the width of the first cladding region 3401 is about 2 microns the width of cladding region 340*n* may be about 18 microns. In this illustrative embodiment, the combined width 350 of each waveguiding segment 330*n* and its adjacent cladding region 340*n* is a constant that can be mathematically expressed as follows:

$$W(330_n) + W(340_n) = \Lambda$$

Figure 7:
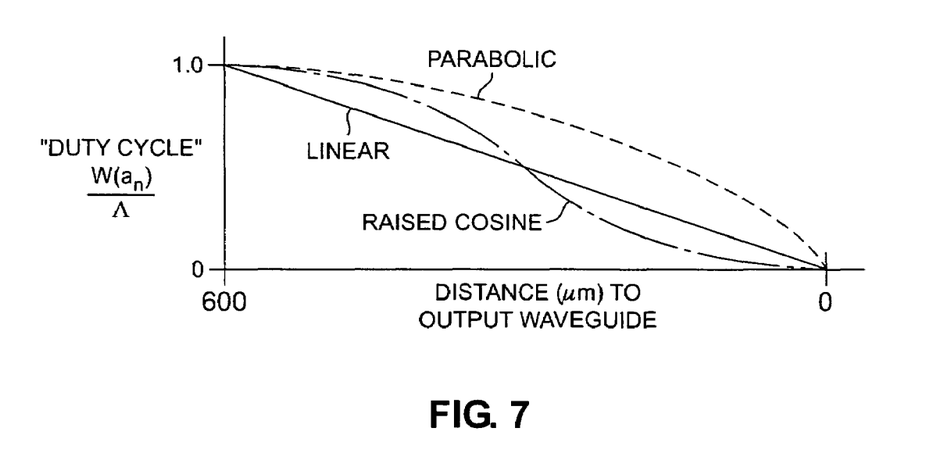
FIG. 7 illustrates various techniques for progressively decreasing the widths of the waveguiding segments.

In the aforementioned embodiment of the invention, the period ($\Lambda$)=20 microns. It should be noted that FIG. 4 is not a dimensionally exact view of the star coupler; rather, the relative sizes of the waveguiding segments 3301 . . . 330*n*, the cladding regions 3401 . . . 340*n* and the waveguide slab 310 have been drawn to illustrate that the widths of the wavegviding segments decrease as they become progressively closer to output waveguides 316; and that the waveguiding segments, the waveguides, and the slab are coplanar and comprise the same material. In FIG. 4 the widths of waveguiding segments 3301 . . . 330*n* are shown decreasing linearly. However, a number of variations are possible that improve insertion loss over the prior art. For example, $\Lambda$ does not need to be a constant and the width of the waveguiding segments do not need to decrease linearly. If, for example, it has been decided that $\Lambda$ is to be constant, then the ratio of the width $W(330_n)$ to the period $\Lambda$ can be viewed as a "duty cycle." Moreover, the duty cycle $W(330_n)/\Lambda$ can be related to the distance from the output waveguides 316 by a number of functional relationships including, but not limited to, raised cosine, linear, and parabolic. These functional relationships are graphically illustrated in FIG. 7. However, the important requirement to be followed in achieving the benefits of the present invention is that $W(330_n)$ decreases as the waveguiding segments 3301 . . . 330*n* become progressively closer to output waveguides 316.

The use of a transition region in a waveguide slab to reduce insertion loss in accordance with the present invention is applicable to a wide variety of different optical components and is not limited to a star coupler such as shown in FIG. 4. For instance, FIGS. 8 and 9 depict other examples of components in which the present invention may be employed.

Figure 8:
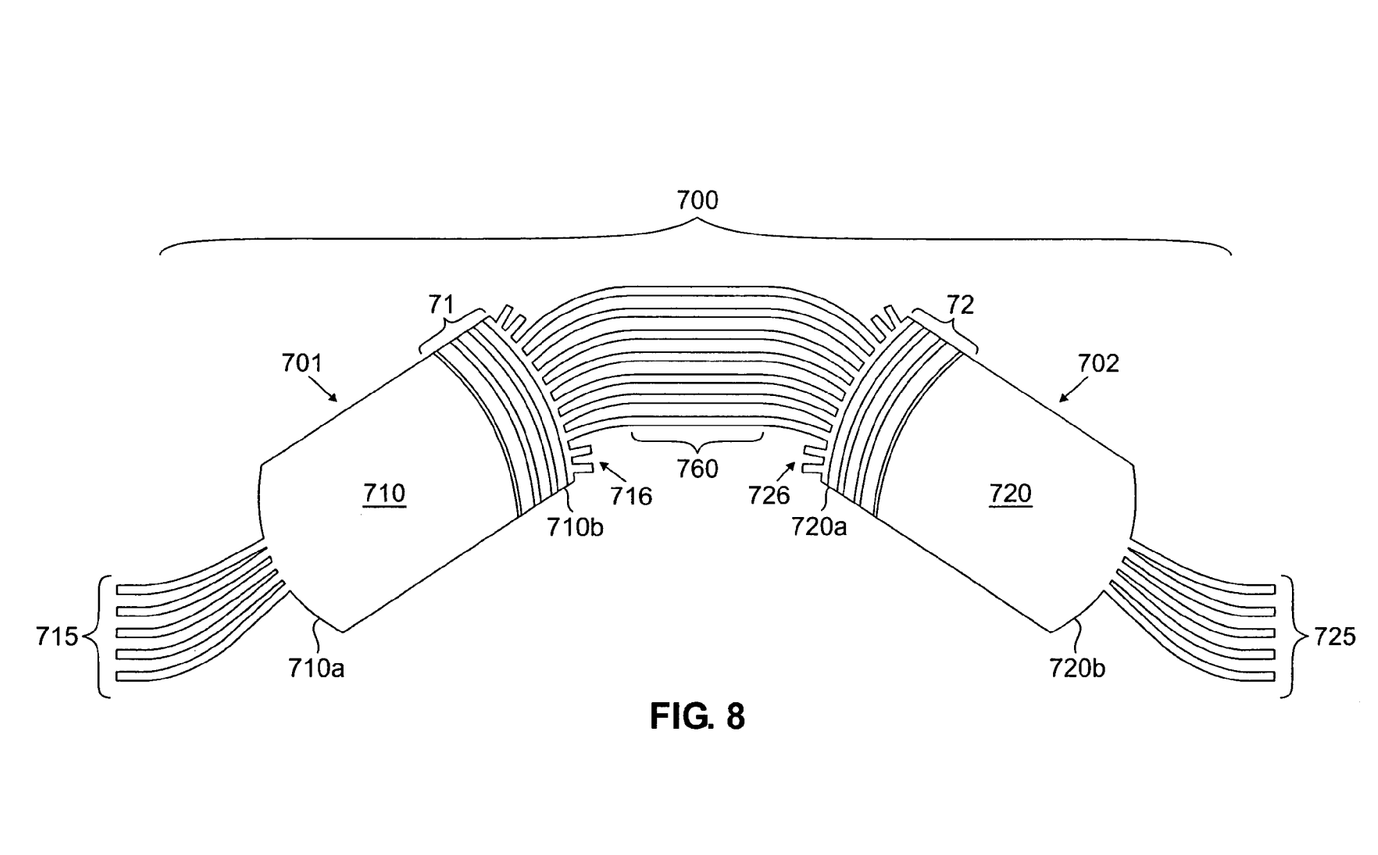
FIG. 8 shows a dense wave-division multiplexer utilizing star couplers constructed in accordance with the present invention.
Figure 9:
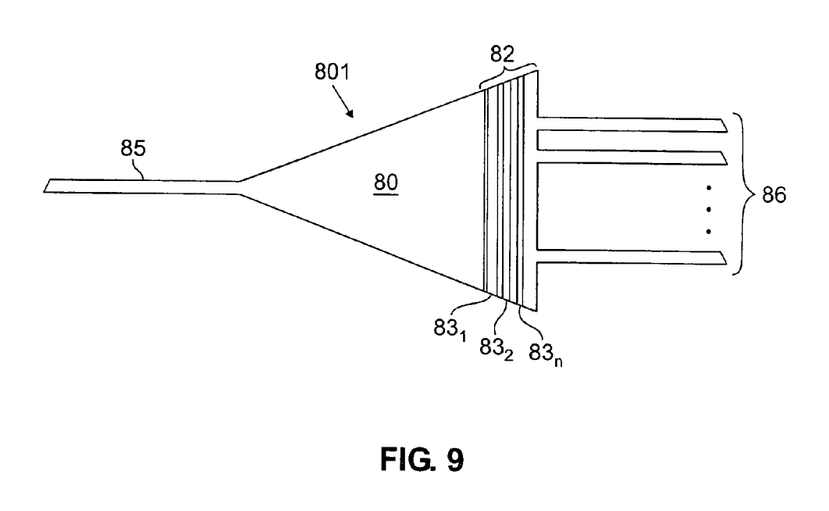
FIG. 9 shows a branch power splitter having low coupling loss constructed in accordance with the present invention.

FIG. 8 discloses a Dense Wave-Division Multiplexer (DWDM) 700 comprising a pair of star couplers 701 and 702 that are interconnected by a number of unequal-length waveguides 760. Each star coupler comprises a slab waveguide located between its input and output waveguide arrays. Each waveguide array is radially directed toward a virtual focal point, and configured so that the foci are located at a predetermined distance away from and outside the slab to minimize phase errors caused by mutual coupling between adjacent waveguides. In star coupler 701, power transfer between array 715 and array 716 is accomplished via radiation in the slab 710. Each of these waveguide arrays is connected to the slab 710 in a substantially uniform fashion along boundaries 710*a* and 710*b* respectively. Similarly, in star coupler 702, power transfer between waveguide array 725 and waveguide array 726 is accomplished via radiation in the slab 720. Each of these waveguide arrays is connected to the slab 720 in a substantially uniform fashion along boundaries 720*a* and 720*b* respectively.

The optical path length of each waveguide in the grating 760 differs from the optical path lengths of all the other waveguides in the grating so that predetermined and different phase shifts are applied to optical signals propagating through the waveguides of the grating from the star coupler 701 because of the different optical path lengths over which the signals in the grating must travel to reach the output of the grating. Accordingly, the optical signals emanating from each of the waveguides of grating 760 have different phases, which are functions of the lengths of the waveguides.

In DWDM 700, demultiplexing is accomplished by transmitting a multiplexed signal through diffraction grating 760, which separates the individual wavelengths of light and diffracts each in a slightly different direction. Multiplexing is accomplished by utilizing DWDM 700 in reverse (i.e., directing each wavelength through the grating at a predetermined wavelength-dependent angle such that all of the wavelengths emerge essentially as one single multiplexed beam of light). The grating function is achieved using an optical, phased array that is constructed from a plurality of waveguides of different lengths. Each waveguide differs in length from its neighboring waveguide by a predetermined amount. The waveguides are substantially uncoupled throughout their entire lengths, except at their ends, where strong mutual coupling between the waveguides is desirable to reduce insertion loss, as explained above. The transition from the coupled portions to the uncoupled portions is gradual, resulting in negligible higher-order mode generation. A discussion of the operation of waveguide grating arrays is presented in U.S. Pat. No. 5,002,350. Moreover, U.S. Pat. No. 5,136,671 is hereby incorporated by reference because it discloses the general design of such DWDMs in greater detail. This type of DWDM structure is also known as a "Dragone" router after its inventor. Significantly, insertion loss is reduced in DWDM 700 by adding transition regions 71 and 72 to waveguide slabs 710 and 720, respectively, whose design is the same as transition region 322 shown in FIG. 4.

A 1×N power splitter consists of a single input waveguide that subdivides into a number (N) of output waveguides. Because this structure frequently resembles the branches of a tree, power splitters are often referred to as branch splitters. As shown in FIG. 9, power splitter 801 comprises an input waveguide 85 and two or more output waveguides 86 that are all coupled to a waveguide region 80, which is designed to efficiently transfer all of the input power to the output waveguides 86. As discussed above, a slab waveguide refers to a planar area that is large compared to the area of an individual waveguide of the same length and which supports lightwave transmission between input and output waveguides. Accordingly, waveguide region 80 is hereinafter referred to as a slab waveguide.

The insertion loss associated with power splitter 801 is decreased by the use of a transition region 82, which is located in slab waveguide 80 and which comprises a number of waveguiding segments 831 ... 83n. In one embodiment of the invention slab waveguide 80 has a length of about 500 microns and over this length its width gradually increases from about 7 microns to about 100 microns. The waveguiding segments 831 ... 83n comprising transition region 82 are generally parallel to each other and have widths that progressively decrease as they become closer to the output waveguides 86. The construction of transition region 82 is substantially the same as the construction of transition region 322, which was discussed in connection with FIG. 4.

Although various particular embodiments of the present invention have been shown and described, modifications are possible within the spirit and scope of the invention. These modifications include, but are not limited to: use of the inventive transition region on the input side of the slab waveguide instead of the output side, or on multiple sides of a slab waveguide; decreasing the widths of the waveguiding segments that comprise the transition region in a non-linear manner; and using the inventive transition region on less than all of the waveguides in an array.

What is claimed is:

1. An optical device comprising:
   a slab waveguide;
   at least one input waveguide coupled to a first side of the slab waveguide;
   a plurality of output waveguides coupled to a second side of the slab waveguide;
   wherein said slab waveguide has a segmented transition region that includes a plurality of waveguiding regions being spaced apart from one other and isolated from one another by at least one discrete sector having a lower refractive index than said waveguiding regions.
2. The optical device of claim 1 wherein said plurality of waveguiding regions have widths that progressively decrease as they approach said second side of the slab waveguide.
3. The optical device of claim 1 wherein said plurality of waveguiding regions and said plurality of output waveguides each comprise a light-carrying core material whose indices of refraction are substantially equal to one another.
4. The optical device of claim 2 wherein the discrete sectors have widths that progressively increase as they approach said second side of the slab waveguide.
5. The optical device of claim 2 wherein the waveguiding regions are substantially parallel to each other.
6. The optical device of claim 5 wherein the waveguiding regions extend in a direction generally perpendicular to the plurality of output waveguides.
7. The optical device of claim 2 wherein said widths of the waveguiding regions progressively decrease in a linear manner.
8. The optical device of claim 2 wherein said widths of the waveguiding regions progressively decrease in a non-linear manner.
9. The optical device of claim 1 wherein the optical device comprises a star coupler having a plurality of input waveguides and a plurality of output waveguides.
10. The optical device of claim 1 wherein the optical device comprises a branch power splitter having a single input waveguide and a plurality of output waveguides.
11. The optical device of claim 1 wherein said input and output waveguides are single mode waveguides.
12. A planar light-guide circuit, comprising:
    a substrate;
    a slab waveguide located on said substrate;
    at least a first waveguide located on said substrate and coupled to a first side of the slab waveguide;
    at least a plurality of second waveguides located on said substrate and coupled to a second side of the slab waveguide;
    N waveguiding regions, where N is an integer greater than or equal to 2, said waveguiding regions being located within said slab waveguide and being spaced apart and isolated from one another by discrete segments having predetermined widths and a lower refractive index than said waveguiding regions.
13. The circuit of claim 12 wherein said waveguiding regions have widths that progressively decrease as they approach said second side of the slab waveguide.
14. The circuit of claim 12 wherein the predetermined widths of said segments have widths that progressively increase as they approach said second side of the slab waveguide.
15. The circuit of claim 13 wherein the predetermined widths of said segments progressively increase as they approach said second side of the slab waveguide.
16. The circuit of claim 12 wherein the combined width of each waveguiding region and its adjacent segment of predetermined width is substantially the same.
17. The circuit of claim 12 wherein said slab waveguide, said N waveguiding regions, and said plurality of second waveguides each comprise a light-carrying core material whose indices of refraction are substantially equal to one another.
18. The circuit of claim 12 wherein said first and said plurality of second waveguides are single mode waveguides.
19. An optical device, comprising
    a first star coupler having a first waveguide array that is coupled to a first slab waveguide;
    a second star coupler having a second waveguide array that is coupled to a second slab waveguide;
    N waveguiding regions, where N is an integer greater than or equal to 2, said waveguiding regions being located within said second slab waveguide and being spaced apart and isolated from one another by discrete segments having predetermined widths and a lower refractive index than said waveguiding regions;
    a grating comprising a plurality of waveguides having unequal optical path lengths, said grating interconnecting the first and second star couplers.

20. The optical device of claim 19 wherein said waveguiding regions have widths that progressively decrease as they approach said first waveguide array.

21. The optical device of claim 19 wherein the predetermined widths of said segments progressively increase as they approach said second waveguide array.

22. The optical device of claim 20 wherein the predetermined widths of said segments have widths that progressively increase as they approach said second waveguide array.

23. The optical device of claim 19 wherein the combined width of each waveguiding region and its adjacent segment of predetermined width is substantially the same.

24. The optical device of claim 19 wherein said first and second slab waveguides, said N waveguiding regions, and said first and second waveguide arrays each comprise a light-carrying core material whose indices of refraction are substantially equal to one another.

25. The optical device of claim 24 wherein said first and second slab waveguide, said N waveguiding regions, and said first and second waveguide arrays are formed on a common substrate.

26. The optical device of claim 19 wherein said first and second waveguide arrays comprise single mode waveguides.

* * * * *

UNITED STATES PATENT AND TRADEMARK OFFICE
CERTIFICATE OF CORRECTION

PATENT NO. : 7,006,729 B2
APPLICATION NO. : 10/039245
DATED : February 28, 2006
INVENTOR(S) : Wang et al.

It is certified that error appears in the above-identified patent and that said Letters Patent is hereby corrected as shown below:

Specification, Col. 5, line 2, after "regions", change "rmn" to -- $r_{mn}$ --.

Specification, Col. 5, line 43, after first word "microns", insert -- , --.

Specification, Col. 7, line 25, after "invention", insert -- , --.

Signed and Sealed this

Second Day of January, 2007

JON W. DUDAS
*Director of the United States Patent and Trademark Office*